United States Patent [19]
Schwellenbach

[11] 3,840,852
[45] Oct. 8, 1974

[54] DEVICE FOR MONITORING THE OPERATION OF DIRECTIONAL SIGNAL LAMPS AND OTHER ELECTRICAL COMPONENTS

[76] Inventor: Robert D. Schwellenbach, 515 East Missouri, Pierre, S. Dak. 57501

[22] Filed: Jan. 12, 1973

[21] Appl. No.: 323,234

[52] U.S. Cl. .............................. 340/80, 340/251
[51] Int. Cl. ...................... B60q 1/02, G08b 21/00
[58] Field of Search...... 340/52 R, 75, 79, 80, 81 R, 340/81 F, 251

[56] References Cited
UNITED STATES PATENTS

| | | | |
|---|---|---|---|
| 1,622,932 | 3/1927 | Warturton et al. | 340/80 X |
| 1,747,093 | 2/1930 | Weintrunn | 340/80 UX |
| 2,127,887 | 8/1938 | Rayburn | 340/79 X |
| 3,355,708 | 11/1967 | Perry | 340/251 X |
| 3,421,157 | 1/1969 | Atkins | 340/251 |
| 3,428,943 | 2/1969 | Carp et al. | 340/80 |
| 3,516,058 | 2/1970 | Sanchez et al. | 340/52 R |
| 3,631,441 | 12/1971 | Murphy | 340/52 R X |
| 3,660,813 | 5/1972 | Rumpf | 340/52 R |
| 3,728,705 | 4/1973 | Atkins | 340/251 |
| 3,735,343 | 5/1973 | Lane et al. | 340/52 A |

FOREIGN PATENTS OR APPLICATIONS

44-22068    9/1969    Japan.................................. 340/80

*Primary Examiner*—Donald J. Yusko
*Assistant Examiner*—K. Leimer
*Attorney, Agent, or Firm*—Williamson, Bains & Moore

[57] ABSTRACT

An electrical device for monitoring the operation of one or more electrical components such as motor vehicle electrical directional signal lamps. The device is connected between the component to be monitored and a power source supplying current to the component. The invention includes monitor means to indicate when the component is operating, current being supplied to the monitor means through controllable monitor switch connected to the power source. Detection means are provided for detecting current flow to the component, and when no current flow is detected, the detection means opens the monitor switch to stop current flow to the monitor means, thereby producing an indication that the component is inoperative. An alarm apparatus is also provided to alert the operator when a component becomes inoperative.

6 Claims, 1 Drawing Figure

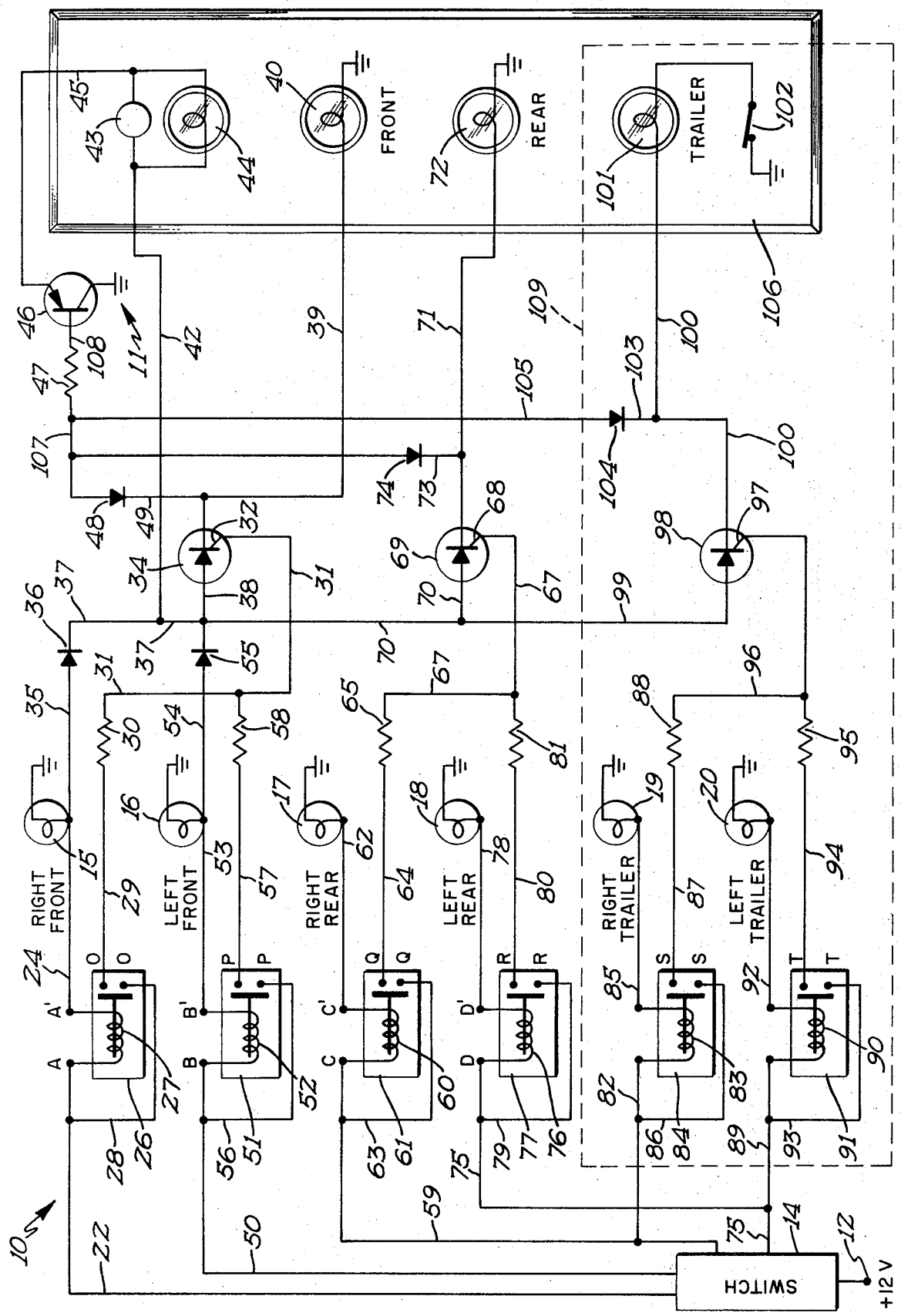

DEVICE FOR MONITORING THE OPERATION OF DIRECTIONAL SIGNAL LAMPS AND OTHER ELECTRICAL COMPONENTS

BACKGROUND OF THE INVENTION

The present invention relates to the field of monitoring operation of electrical components, and provides a highly reliable and long lasting device to immediately alert an operator when a monitored component becomes inoperative.

Many electrical components are operated at locations remote from an operator where it is difficult or impossible for the operator to visually confirm their operation. In such instances, if the component fails, knowledge of the failure may not reach the operator in time to prevent expensive damage to other equipment and sometimes life endangering accidents. Although the present invention has application to the monitoring of a wide variety of electrical components, it is particularly well adapted to the monitoring of directional signal lamps in motor vehicles.

Efficient high speed operation of cars and trucks is heavily dependent on each vehicle having operational directional signal lamps to warn of the driver's intention to turn. Most drivers assume that their directional signal lamps are operational until informed to the contrary, and accordingly it is of pressing importance that the driver be warned immediately to prevent accident when one or more directional lamps become inoperative. Without such warning the likelihood of life endangering accident is greatly increased, and the potential property damage to the large cargos carried by modern trucks and trailers can of itself be extremely substantial.

SUMMARY OF THE INVENTION

The invention utilizes component monitor means such as a light positioned on a control panel to alert an operator when failure of the monitored component occurs. Typically the component to be monitored is actuated by a conventional power switch, and a controllable monitor switch is electrically connected between the component to be monitored and the power switch, the monitor switch preventing current flow from the power switch to the component monitor means when open and permitting such current flow when closed. Detection means are used to detect current flow to the component, and in response to such current flow the detection means closes the monitor switch, permitting current to flow from the power switch to the monitor means to indicate to the operator that the component is functioning normally. If no current flow is detected by the detection means, the monitor switch remains open, and the monitor means receives no power, indicating to the operator that the monitored component is inoperative.

The invention gives an immediate visual warning to the operator when failure of the monitored component occurs. In addition, the invention may be provided with an audible alarm apparatus to attract his attention. The invention is particularly well adapted to the monitoring of motor vehicle directional signal lamps and not only indicates when a lamp has failed, but is arranged to indicate whether front, rear, or truck trailer directional signals have become inoperative.

The invention is constructed and arranged to function efficiently with a minimum of power and will not interfere with normal operation of a monitored component or the directional signal lamp system of a vehicle. Even if the invention breaks down, it has no adverse effect upon the monitored component. The invention is simple to manufacture and install, relatively inexpensive, and can be easily added to existing motor vehicles as an accessory or built in as original equipment. It is contemplated that the invention may be used with a wide variety of electrical components other than directional signal lamp systems to monitor their operation and alert an operator when failure of the component occurs.

BRIEF DESCRIPTION OF THE DRAWING

The Drawing is a schematic electrical circuit diagram of an embodiment of the invention used to monitor the operation of the directional signal lamps of a motor vehicle.

DESCRIPTION OF THE PREFERRED EMBODIMENTS

Referring now to the drawing, the device 10 has a power supply 12, which may be a conventional automobile 12 volt battery and a power switch 14 connected thereto. The power switch 14 may be of any design, the type shown being a conventional directional signal power switch such as that found on the steering column of most modern automobiles.

The electrical components to be monitored are represented by directional signal lamps 15, 16, 17, 18, 19, and 20, of which the even numbered lamps represent right turn signal lamps and the odd numbered lamps left turn signal lamps. Signal lamps 15 and 16 form a set of directional signal lamps and are representative of the front directional signal lamps on a car or truck. Signal lamps 17 and 18 form a second set of directional signal lamps and are representative of the rear signal lamps on an automobile or truck tractor. Signal lamps 19 and 20 form a third set of directional signal lamps and are representative of the signal lamps at the rearward end of a trailer. It should be understood that while electrical lamps are shown here as the monitored component, other electrical components could instead be monitored, and that the directional signal lamps shown here are purely illustrative of one type of electrical component which could be monitored by the invention.

Conductor 22 extends from the switch 14 to terminal A of relay 26, a second conductor then extending from terminal A of relay 26 to the front right signal lamp 15, which is grounded to the vehicle chassis.

The relay 26 is typically a reed relay, although it should be understood that other relays can be used. The relay 26 has its holding coil 27 connected in series with and between the power switch 14 and the signal lamp 15, requiring that any current flowing through the lamp 15 must first pass through the holding coil 27 of the relay 26. Terminals 0—0 of relay 26 are normally open and close only when holding coil 27 is energized by current flow to the signal lamp 15. When closed, current flows from conductor 22 along conductor 28, through terminals 0—0 and along conductor 29. A resistor 30 is connected in series with conductor 29, and conductor 31 extends from resistor 30 to the gate terminal 32 of a conventional silicon controlled rectifier 34, the operation of which will be discussed in further detail hereafter.

A conductor 35 extends from the directional lamp 15 to the diode 36, conductor 37 extending from the output of the diode 36 to conductor 38 which connects to the input terminal of the silicon controlled rectifier 34. Accordingly, current from power source 12 flows through switch 14, conductor 22, holding coil 27, conductors 24 and 35, diode 36, conductors 37 and 38 to the input terminal of the silicon controlled rectifier 34 whenever switch 14 is in a closed condition. The output terminal of the rectifier 34 is connected through conductor 39 to its associated directional signal monitor light 40, which is grounded.

The silicon controlled rectifier 34 provides a controllable monitor switch which remains open to prevent current flow from conductor 38 to conductor 39 unless an appropriate gate signal is delivered to the gate terminal 32. When such a signal is received at gate 32, the rectifier 34 becomes conducting and acts as a closed switch, permitting current flow from conductor 38 to conductor 39, lighting the monitor light 40.

When the invention detects an inoperative condition of component 15, the monitor light 40 remains unlighted. It has been found, however, that an operator will detect a flashing light or audible signal more rapidly than the off condition of the monitor light 40. Consequently an alarm apparatus 11 has been provided to insure that the operator is immediately alerted of component failure. The alarm apparatus has a conductor 42 which extends from conductor 37 to audible alarm 43 which is electrically connected in parallel with alarm light 44. A transistor 46 is connected in series with the audible alarm 43 and alarm light 44, the collector terminal of the transistor 46 being grounded. The base of transistor 46 is connected by conductor 108 to resistor 47, the resistor being in series with a diode 48, which is connected by conductor 49 to conductor 39. The elements 42 alarm 43, light 44, conductor 45, transistor 46, resistor 47, diode 48, and conductors 108, 107 and 49 collectively form an alarm apparatus 11 effective for alerting the operator to a failure of the component 15.

While additional elements of the device 10 remain to be explained hereafter, it should be understood that the elements thus far discussed, aside from lamps 16, 17, 18, 19, and 20, are effective to form a device for monitoring the operation of the electrical component 15. In addition it should be understood that the monitoring operation may be successfully accomplished without the use of the alarm apparatus 11 already pointed out, but use of such apparatus substantially increases the efficiency of the device.

In operation, when a single component 15, which may be any of a variety of electrical components, is to be monitored, the thus far described circuit works as follows. When the power switch 14 is closed to supply power to the component 15, current flows from the power source 12, through switch 14 and along conductor 22 passing through holding coil 27 of relay 26 and thence through component 15 to ground so long as the component 15 is operating. When normal operation of the component 15 occurs, the holding coil 27 of relay 26 is actuated to close terminals 0—0, permitting current to flow from conductor 22 successively through conductor 28 and terminals 0—0 to conductor 29 and resistor 30. Current flows from resistor 30 through conductor 31 to gate terminal 32 of the silicon controlled rectifier 34 thereby causing the rectifier 34 to conduct and form a closed circuit from conductor 38 to 39. The resistor 30 serves the purpose of limiting the current flow to the gate terminal 32 to provide an appropriate current level for a gate signal.

Current flows from conductor 24 to conductor 35, passes through diode 36 and conductors 37 and 38 to reach the silicon controlled rectifier 34, which now being, in effect, a closed switch permits current to flow therethrough to conductor 39 and through monitor light 40 to ground. Consequently the light 40 is lighted whenever the component 15 is operating indicating to the operator that the component 15 is operating.

Since the silicon controlled rectifier 34 is, in effect, a closed switch, the voltage at conductor 37 and at conductor 39 is substantially equal, and accordingly there is no current flow through conductor 42 to the alarm apparatus and the transistor 46 is in an off condition. Consequently the alarm light 44 and the audible alarm 43 are off while the component 15 is operating.

When the component 15 burns out or otherwise becomes an open circuit the current drawn by the component 15 no longer flows through holding coil 27 of relay 26, and the terminal 0—0 of the relay 26 open, preventing further current flow from conductor 28 to conductor 29 and thence to gate terminal 32 of the rectifier 34. As a result, the rectifier 34 no longer acts as a closed switch, and instead becomes, in effect, an open switch, preventing current flow from conductor 38 to conductor 39. With current to conductor 39 interrupted, the monitor light 40 immediately goes off to indicate that the component 15 is inoperative.

If desired, the alarm apparatus 11 already described may be used to further alert an operator that the component 15 has failed, and its operation will now be described.

When the component 15 becomes inoperative, the current formerly required by component 15 is no longer drawn from the switch 14 and through holding coil 27 of relay 26. Since there is no longer adequate current passing through the holding coil 27, the terminals 0—0 reopen. A relatively small current still flows from switch 14, through conductor 22 and coil 27 of relay 26 passing through conductor 24 and 35 and through diode 36. This current continues along conductors 37 and 42 passing through alarm light 44 and through relatively low power electronic audible alarm 43 thereby producing a visual and audible signal to attract the attention of an operator. This small current through coil 27 is not sufficient to close terminals 0—0. Current leaves elements 43 and 44 flowing along conductor 45 and passing through the transistor 46 to ground. The transistor 46 permits this current flow therethrough since it is now in an on condition because conductor 39 is now at a lower potential than conductor 42, permitting an emitter-to-base current to flow from the transistor successively through conductor 108, resistor 47, conductor 107 and diode 48, conductors 49 and 39, eventually flowing to ground through the monitor light 40. This relatively small base current from the transistor 46 is far too small to turn on monitor light 40. Accordingly when the component 15 becomes inoperative, the monitor light 40 immediately turns off, the alarm light 44 turns on, and audible alarm 43 creates a buzzer sound to attract the attention of the operator. In the event that the switch 14 is a time dependent switch which produces a series of periodic pulses of the type associated with automotive electrical directional signal switches, then the alarm light 44 and alarm 43 also pulse on and off at the pulse frequency of the switch.

Having explained the operation of the device 10 when used with a single monitored component 15, the structure and operation of the device with a single set of motor vehicle directional signal lamps will now be described.

Referring now to the device 10 of the drawing, a conductor 50 extends from the power switch 14 to terminal B of relay 51. Holding coil 52 of the relay 51 is connected in series with conductor 50 and current entering the holding coil 52 from conductor 50 leaves the holding coil by conductor 53 which is connected in series with left front directional signal lamp 16, through which current flows to ground. A conductor 54 extends from the lamp 16 to diode 55 which is connected to conductor 38.

The conductor 56 extends from conductor 50 to a terminal P of the relay 51. When the holding coil 52 of the relay 51 is energized, the terminals P—P close and current flows from conductor 56 through the terminals P—P to conductor 57 and through resistor 58 to conductor 31.

A conductor 59 extends from the switch 14 to the terminal C of holding coil 60 of relay 61, a conductor 62 extending from terminal C' of the holding coil to the right rear directional signal lamp 17 which is grounded to the chassis of the vehicle.

A conductor 63 extends from conductor 59 to the terminal Q of relay 61, a conductor 64 extending from the remaining Q terminal of the relay 61 to resistor 65. A conductor 67 extends from resistor 65 to the gate terminal 68 of silicon controlled rectifier 69. The rectifier 69 is connected to conductor 37 by conductor 70. Current reaching the rectifier 69 through conductor 70 leaves the rectifier through conductor 71 which extends to rear monitor light 72, the light being grounded to the vehicle chassis. A conductor 73 connects conductor 71 to diode 74 which is electrically connected in series with resistor 47 of the alarm apparatus 11.

A conductor 75 extends from the switch 14 to the terminal D of holding coil 76 of relay 77. Terminal D of the coil 76 is connected to a conductor 78 which extends to the left rear directional signal lamp 18 which is grounded to the chassis.

A conductor 79 extends from conductor 75 to terminal R of relay 77, a conductor 80 extending from the remaining terminal R of relay 77 to resistor 81, which in turn is connected to conductor 67.

A conductor 82 extends from conductor 59 to the holding coil 83 of relay 84, the holding coil being connected to conductor 85 which extends to rear trailer signal lamp 19 which is grounded to the vehicle chassis. A conductor 86 extends from conductor 82 to a terminal S of relay 84, a conductor 87 extending from the remaining terminal S of the relay 84 to resistor 88.

Conductor 89 extends from conductor 75 to the holding coil 90 of relay 91, conductor 92 extending from the holding coil to the left trailer signal lamp 20 which is grounded to the vehicle chassis. Conductor 93 extends from conductor 89 to a terminal T of the relay 91, the remaining terminal T being connected by conductor 94 to resistor 95. Conductor 96 extends between resistors 88 and 95, connecting them in parallel and extending to the gate terminal 97 of silicon controlled rectifier 98.

A conductor 99 interconnects conductor 70 and silicon controlled rectifier 98. Conductor 100 extends from the downstream side of the rectifier 98 to the trailer monitor light 101 which is connected to ground through switch 102. A conductor 103 extends from conductor 100 to diode 104, a second conductor 105 extending from the diode 104 to resistor 47, placing the diode 104 in parallel with diodes 74 and 48.

It should be noted that the number of monitor lights is equal in number to the number of sets of directional signal lamps so that a monitor light monitors each set or pair of directional lamps. Since each monitor light requires a controllable monitor switch, the number of silicon controlled rectifiers is equal to the number of monitor lights. In the shown embodiment 10, the number of relays or detection apparatuses is equal to the number of signal lamps, although such equality is not essential to the invention. The number of diodes, such as diodes 48, 74, and 104, in the alarm apparatus should be equal in number to the number of sets of directional signal lamps being monitored.

The switch 14, which is a motor vehicle directional signal type of switch, may be switched from an off position to a position energizing all right turn signal lamps or alternatively to a position energizing all left turn signal lamps. Right and left turn signal lamps will never be energized simultaneously by the switch 14.

It is preferred that the monitor lights 101, 72, and 40, along with alarm light 44 and audible alarm 43 be positioned on a control panel 106 within the cab of the motor vehicle adjacent the driver. The lights 40, 72, and 101 collectively represent component monitor means for monitoring the operation of a plurality of components such as 15, 16, 17, 18, 19, and 20, but it should be understood that if a single component 15 is to be monitored, only single monitor light 40 or other indicator known to the art is required to form monitor means for the single component.

In operation, when a driver or operator actuates the directional signal switch 14, as when a right hand turn is to be made, current flows from power source 12 through the switch 14 and along conductors 22 and 59, the current being delivered in the form of pulses to cause the directional signal lamps to flash as is conventional with modern directional signal apparatus.

Current flowing along conductor 22 passes through holding coil 27 of relay 26, actuating the relay 26 as the current passes to and through right front directional lamp 15 causing the lamp to flash. As the relay 26 closes terminals 0—0, current flows from conductor 22 through conductor 28, passing through the terminals 0—0 and leaving the relay by conductor 29. Current passing along conductor 29 passes through resistor 30 and flows along conductor 31 to the gate terminal 32 of silicon controlled rectifier 34, causing the rectifier 34 to be biased so as to make it conducting. The resistor 30 limits the magnitude of the current to the gate terminal 32 to an acceptable level compatible with the rectifier 34.

Current reaching the right front signal lamp 15 through conductor 24 divides, a small amount of current passing along conductor 35 and through diodes 36 to conductor 37, current from conductor 37 then flowing along conductor 38 to and through silicon controlled rectifier 34 and along conductor 39 to front monitor light 40 and thence to ground. Current flow through the light 40 causes the monitor light 40 to flash in unison with the right flow directional signal lamp 15, thus indicating to an operator that the right front signal lamp 15 is operating. No current flow occurs along conductors 42 or 49 to the alarm apparatus 11 since the transistor 46 is off because the voltage at conductors 42 and 49 is identical and consequently no base current flows through the transistor 46 to turn it on. Accordingly the audible alarm 43 and the alarm light 44 remain off.

As current flows along conductor 22, current also flows from conductor 59 to the holding coil 60 of relay 61 and also along conductor 82 to the holding coil 83 of relay 84, actuating the relays 61 and 84 and closing relay terminals Q—Q and S—S, respectively. Current flows from the holding coil 60 of relay 61 to and through right rear signal lamp 17 to ground, causing the signal lamp 17 to flash simultaneously with the right front signal lamp 15. Since terminals Q—Q of relay 61 are closed, current flows from conductor 59 through conductor 63, relay 61, conductor 64, resistor 65, and conductor 67, to reach gate terminal 68 of silicon controlled rectifier 69.

The silicon controlled rectifier 69 acts as a closed switch and current from conductor 37 flows along conductor 70 and through the rectifier 69 to conductor 71 and rear monitor light 72, causing the monitor light 72 to flash in unison with its associated signal lamp 17. The flashing of monitor light 72 indicates to the operator that the rear signal lamp 17 is operating normally. Because the voltage at conductor 71 is substantially equal to the voltage at conductor 42, no current flows through the alarm apparatus 11, and the transistor 46 remains off due to the absence of any base current therethrough. Accordingly, the audible alarm 43 and alarm light 44 remain off.

Current from conductor 59 also flows to conductors 82 and 86, energizing the holding coil 83 of relay 84 and causing the right rear trailer signal lamp 19 to flash in unison with the other signal lamps already described as in operation. Current flows along conductor 86, through the terminals S—S of relay 84 and thence to the gate terminal 97 of the rectifier 98, causing the rectifier to act as a closed switch. Accordingly current flows from conductor 70 through conductor 99, the rectifier 98, conductor 100, and trailer monitor light 101, causing it to flash in unison with the trailer directional signal lamp 19, the current then passing through the switch 102 to ground. Because the voltage at conductor 100 is substantially equal to the voltage at conductor 42, no current flows through the alarm apparatus 11 and the transistor 46 remains off since all signal lamps are operating.

When a left turn is signalled by switch 14, current flows along conductors 50 and 75 from the switch 14 to holding coils 52, 76, and 90 of relays 51, 77, and 91, respectively, energizing each holding coil and closing the terminals of the relay. Because the operation of the circuit is extremely similar whether right or left turn signal lamps are energized, the description of operation when the left turn lamp is energized will be limited to a description of the circuit associated with the left front directional signal lamp 16. Accordingly, current flows from holding coil 52, through conductor 53 and lamp 16, energizing the lamp and passing to ground. Some of the current from conductor 53 flows along conductor 54 through diode 55 to the silicon controlled rectifier 34. Because current is simultaneously flowing from conductor 50 through conductor 56 and terminals P-P of relay 52 to conductor 57, resistor 58, and finally through conductor 31 to gate terminal 32 of rectifier 34, the rectifier 34 is substantially a closed switch, and current from conductor 38 passes through the rectifier to conductor 39 and front monitor light 40. Accordingly, each time the signal lamp 16 flashes, the front monitor light 40 flashes in unison, indicating that the lamp 16 is operative.

It should be understood that the diodes 36 and 55 prevent current from passing from the right directional signal lamps to the left directional signal lamps and vice versa while the device 10 is operating. Accordingly, when current passes forwardly through diode 36, it cannot pass in the back bias direction through diode 55. It should also be noted that the energizing current supplied to each of the monitor lights 40, 72, and 101 as well as to alarm light 44 and alarm 43 is supplied through diode 36 or through diode 55, which obtains its current from the conductors 50 or 22 which are the front signal lamp connections of the directional signal switch 14. This mode of connection has been selected because it has been found undesirable to obtain the current for the monitor lights from the conductors 59 or 75, which are associated with the rear signal lamp terminals of the switch 14 since the rear signal lamps are periodically energized by the braking system to produce a brake light effect. The brake light current, if introduced into the circuit 10 to energize the monitor lights 40, 72, and 101 could cause malfunction when the brake is applied.

In the event any of the directional signal lamps 15, 16, 17, 18, 19, or 20 burn out or become loose in their sockets to create an open circuit condition, the circuit 10 detects it as soon as the lamp fails to function. For purposes of illustration, it shall be presumed that lamp 17 has become inoperative due to burn out. When the operator signals a right hand turn, no current flows through conductor 59 to holding coil 60 because there is no path for the current to follow to ground. Accordingly the terminals Q—Q of relay 61 remain open and the gate terminal 68 of rectifier 69 receives no biasing current to cause the rectifier to act as a closed switch. Accordingly, the rectifier remains, in effect, an open switch and no current passes through it from conductor 70 to conductor 71.

Because the remaining right signal directional lamps 15 and 19 are functioning properly, current flows through the relays 84 and 26 in the manner already described for normal operation causing monitor lights 40 and 101 to light each time the signal lamps 15 and 19 flash. Current reaches the rectifiers 34 and 98 by the path of conductor 22, holding coil 27, conductors 24 and 35, diode 36, and conductors 37, 70 and 99. Current then flows through the rectifiers 34 and 98 to the monitor lights 40 and 101, respectively. Since the rectifier 69 is, in effect, an open switch, no current passes through it to light the monitor light 72, indicating to the operator that the right signal lamp at the rear of the car or tractor is inoperative. Since the voltage at conductor 71 is substantially zero, and that at conductor 42 is notably higher, a forward bias is placed on the transistor 46, turning it on, and permitting current to flow from conductor 37 along conductor 42 through audible alarm 43 and alarm light 44 to conductor 45 and through the transistor 46 to ground. This causes the alarm light 44 and the audible alarm 43 to become operative to visually and audibly alert the operator that a lamp is inoperative. By noting that monitor light 72 is not flashing, the operator can tell at once that its associated lamp 17 is inoperative.

A small base current flows through the transistor from conductor 45 to the resistor 47 and then through conductor 107, diode 74 and conductor 71, flowing to ground through monito light 72. This small base current is far too small to turn on the light 72.

It should thus be understood that if signal lamps 17 or 18 fail, the monitor light 72 remains off and a voltage imbalance occurs between conductor 42 and 71 causing the alarm apparatus 11 to operate. In the event either lamp 15 or 16 fails, the monitor light 40 no longer lights and a voltage imbalance occurs between conductor 49 and conductor 42, actuating the alarm apparatus. If either light 19 or 20 become inoperative monitor light 101 does not light and a voltage imbalance occurs between conductors 100 and 42 causing the alarm apparatus 11 to become operative. When a directional lamp is found inoperative, the remaining monitor lights associated with operative signal lamps continue to function normally and indicate that the operative lamps are in such condition.

Each of the relays 26, 51, 61, 77, 84, and 91 serves as a detection apparatus for detecting current flow to the directional signal lamp connected downstream from the relay. Any current reaching the directional signal lamp and having ample magnitude to light the signal lamp is sufficient to energize the holding coil of the relay and thereby actuate it. Accordingly each relays detects current flow through the signal lamp associated therewith and, in response to detection of such current, closes to permit current flow from the power switch 14 to a silicon controlled rectifier.

It should be understood that the device 10 may be used with automobiles or pickup trucks without trailers, or alternatively may be used with a car and trailer or truck and trailer. If the device is to be used on an automobile without trailer, the portion of the circuit enclosed in the dotted envelope 109 may be deleted since it is needed only to monitor a third set of directional signal lamps associated with the trailer. In the event the trailer whose lamps are being monitored is disconnected from its truck trailer for storage or the like, the operator opens switch 102, the result of which is that the emitter to base current from transistor 46 can no longer flow from the transistor through conductor 105, diode 104, conductors 103 and 100, and through the light 101 to ground since the switch 102 is open. This prevents the transistor 46 from turning on in response to the off condition of the trailer signal lamps 19 and 20 and consequently no alarm is produced and the circuit 10 becomes insensitive to the absence and resulting inoperability of the trailer lamps.

Accordingly, by utilizing the device 10 the driver can check the operation of his signal lamps each time he makes a turn, and he is warned as soon as one of the lights fails to operate. The warning includes both flashing lights 44 and audible wraning 43 so as to assure immediate notification to the operator when trouble occurs. By noting which monitor light is off, he also knows which signal lamp is inoperative. As a result, when the operator discovers an inoperative signal lamp he can utilize alternative signalling means such as arm signals or can take extra precautions until the lamp is repaired or replaced.

While the preferred embodiments of the present invention have been described, it should be understood that various changes, adaptations and modifications may be made therein without departing from the spirit of the invention and the scope of the appended claims.

What is claimed is:

1. A vehicle safety device for monitoring the operation of a plurality of electrical directional signal lamps which are selectively energized by current flow through a directional signal power switch connected to a power source comprising:

a plurality of directional signal monitor lights equal in number to the number of directional signal lamps used in signaling a turn by the vehicle;

a plurality of silicon controlled rectifiers equal in number to the number of directional signal monitor lights, each silicon controlled rectifier having a gate terminal and each silicon controlled rectifier operatively electrically connected in series with a said directional signal monitor light to energize the monitor light when said silicon controlled rectifier is conducting, each silicon controlled rectifier electrically connectable to the directional signal power switch to conduct current from the directional signal power switch to the in-series connected monitor light when in a conducting state and to prevent current flow to the in-series connected monitor light when nonconducting;

a plurality of relays equal in number to the number of directional signal lamps, each relay having a holding coil and a normally open relay switch, each said relay switch closing when said holding coil is energized;

each said relay having its relay switch and holding coil connectable to the directional signal power switch to receive current from the power source when the directional signal power switch is closed;

each said relay having its holding coil connectable in series with a pre-determined directional signal lamp so that current flow from the directional signal power switch to each directional signal lamp passes through the holding coil of one of said relays; and each said relay having its relay switch electrically connected to the gate terminal of one of said silicon controlled rectifiers to bias the silicon controlled rectifier to a conducting state when current flows from the directional signal power switch through the relay switch and to the gate terminal of the silicon controlled rectifier, causing a monitor light to be energized in response to each directional signal lamp energized.

2. The vehicle safety device of claim 1 wherein said plurality of relays is twice the number of silicon controlled rectifiers and each said silicon controlled rectifier has its gate terminal connected in series with a pair of said relay switches, said relay switches comprising each pair of relay switches being connected in parallel with one another.

3. The vehicle safety device of claim 1 and further including an alarm apparatus operatively electrically connected with said monitor lights to sense the absence of current flow to the said monitor lights when the directional signal power switch is on, and in response to such absence of current flow to alert the operator.

4. The vehicle safety device of claim 3 wherein said alarm apparatus includes a plurality of diodes equal in number to the number of monitor lights and further includes a transistor switch, said plurality of diodes being connected in series with the base of said transistor switch, a said diode being operatively electrically connected to each said monitor light.

5. The vehicle safety device of claim 3 wherein said alarm apparatus includes an sudible alarm electrically connected to said transistor switch and energized by said transistor switch when said alarm apparatus senses the absence of current flow to any monitor light when the directional signal power switch is closed.

6. A vehicle safety device for use with an electrical power source comprising:
   a plurality of electrical directional signal lamps;
   a directional signal power switch connectable to the power source;
   a plurality of relays equal in number to the number of said directional signal lamps, each relay having a holding coil and a normally open relay switch, each said relay switch closing when said holding coil is energized;
   each said relay having its said relay switch and said holding coil operatively electrically connected to said directional signal power switch and energized therefrom when said power switch is closed;
   each said relay having its said holding coil operatively electrically connected in series with one of said directional signal lamps so that current flow from said directional signal power switch to each said directional signal lamp passes through said holding coil of one of said relays and lights the signal lamp;
   a plurality of directional signal monitor lights equal in number to the number of directional signal lamps used in signaling a turn by the vehicle;
   a plurality of silicon controlled rectifiers equal in number to the number of directional signal monitor lights, each said silicon controlled rectifier having a gate terminal and each said silicon controlled rectifier operatively electrically connected in series with a said directional signal monitor light to energize the monitor light when said silicon controlled rectifier is conducting, each silicon controlled rectifier electrically connected to said directional signal power switch to conduct current from said directional signal power switch to the in-series connected monitor light when in a conducting state and to prevent current flow to the in-series connected monitor light when non-conducting; and
   each said relay having its relay switch operatively electrically connected to said gate terminal of one of said silicon controlled rectifiers to bias said silicon controlled rectifier to a conducting state when current flows from said directional signal power switch through said relay switch and to said gate terminal of said silicon controlled rectifier, causing a monitor light to be energized in response to each directional signal lamp energized.

* * * * *